June 10, 1958 O. J. SKAWDEN ET AL 2,838,090

CROSS ROLL STRAIGHTENING APPARATUS IN WHICH THE OPPOSED ROLLS ARE DRIVEN THROUGH A DIFFERENTIAL MECHANISM

Filed July 12, 1955 8 Sheets-Sheet 1

INVENTORS
JOSEPH H. GETTIG &
ODD J. SKAWDEN
BY Brown, Critchlow, Flick & Peckham
THEIR ATTORNEYS

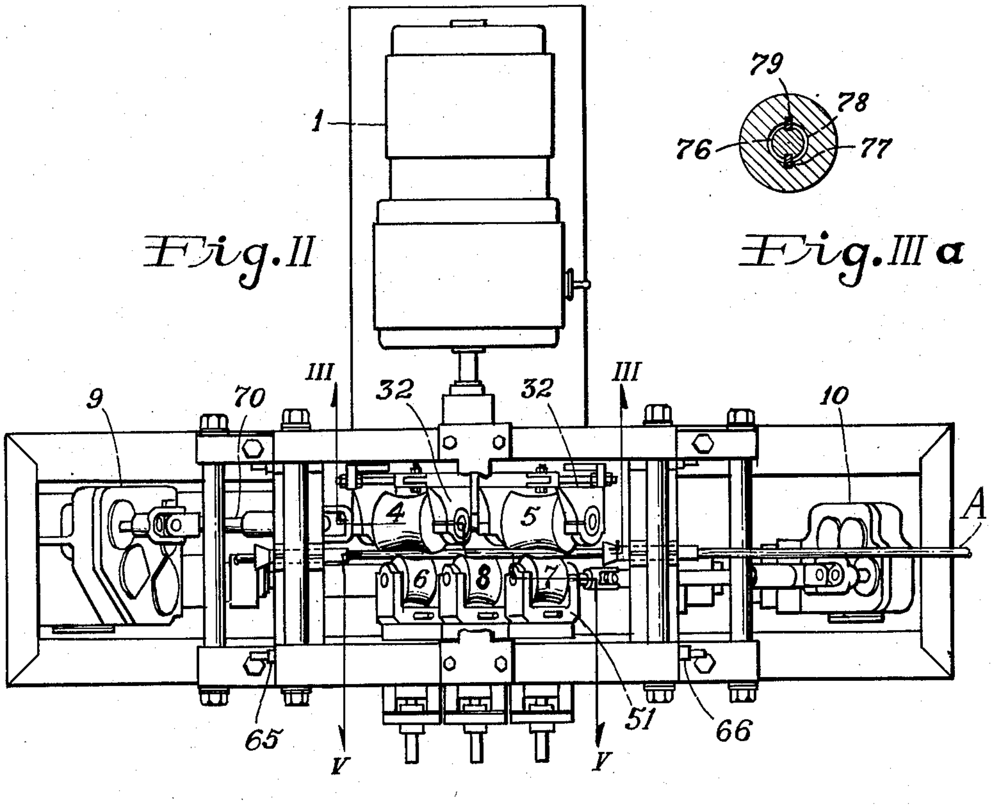
Fig. II, Fig. III a
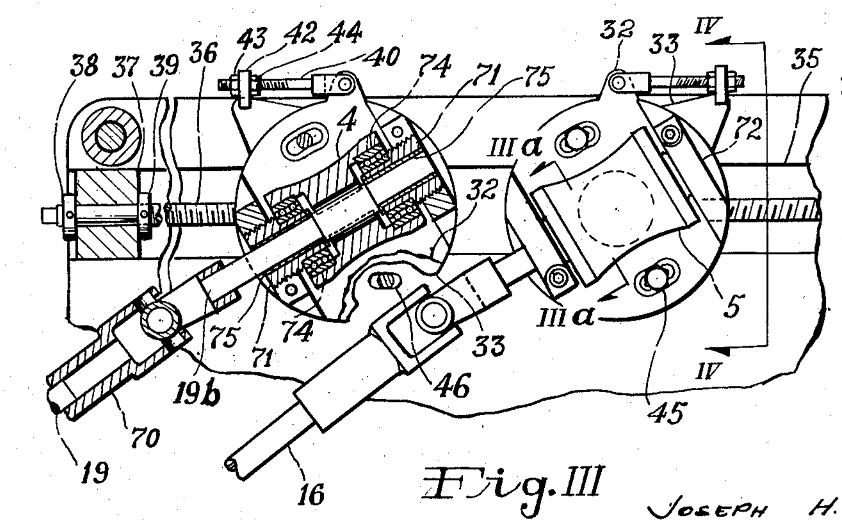
Fig. IV
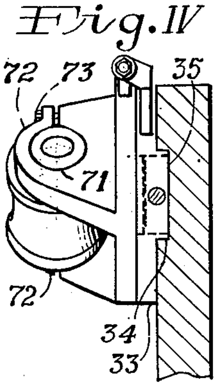
Fig. III
INVENTORS
JOSEPH H. GETTIG &
ODD J. SKAWDEN
BY Brown, Aitchlow, Flick & Peckham
THEIR ATTORNEYS CROSS ROLL STRAIGHTENING APPARATUS IN WHICH THE OPPOSED ROLLS ARE DRIVEN THROUGH A DIFFERENTIAL MECHANISM
Filed July 12, 1955 8 Sheets-Sheet 3
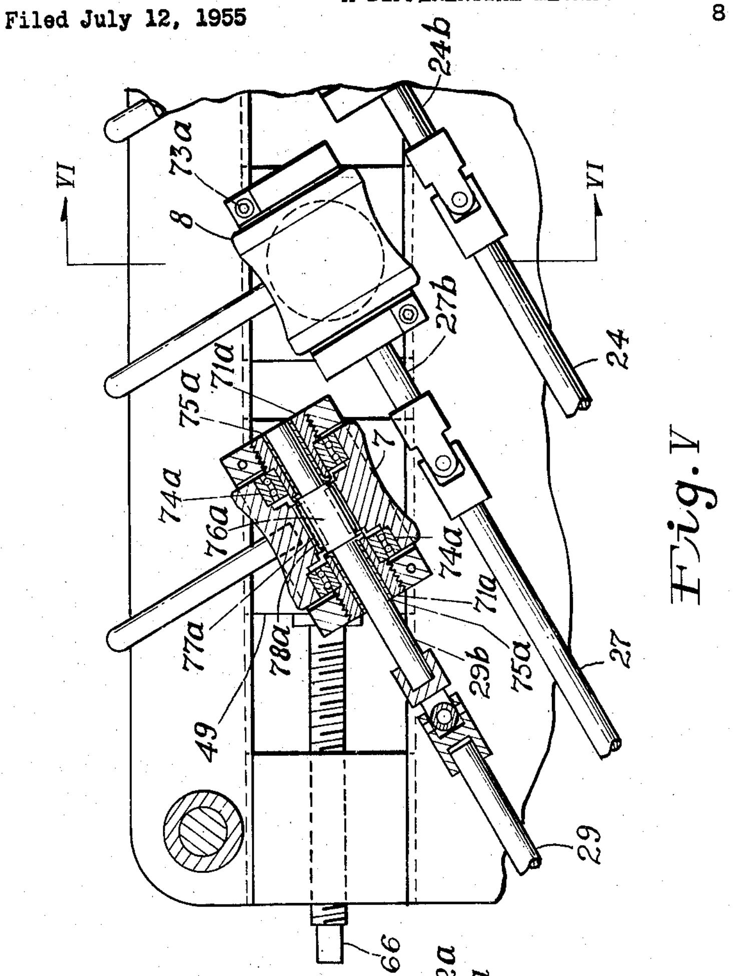
Fig. V
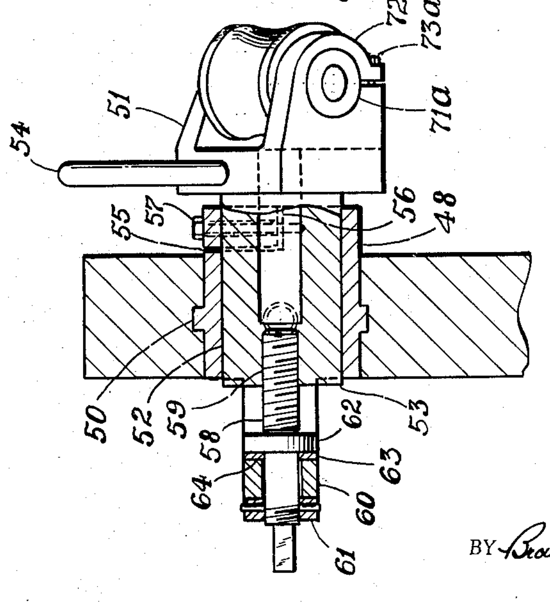
Fig. VI
INVENTORS
JOSEPH H. GETTIG &
ODD J. SKAWDEN
BY Brown, Critchlow, Flick & Peckham
THEIR ATTORNEYS June 10, 1958 O. J. SKAWDEN ET AL 2,838,090
CROSS ROLL STRAIGHTENING APPARATUS IN WHICH THE OPPOSED ROLLS ARE DRIVEN THROUGH A DIFFERENTIAL MECHANISM
Filed July 12, 1955 8 Sheets-Sheet 4
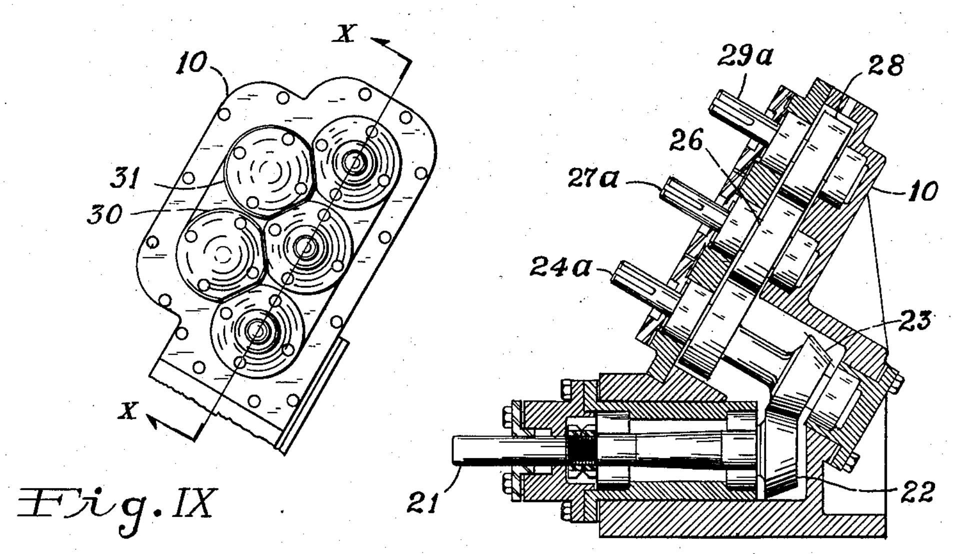
Fig. IX, Fig. X
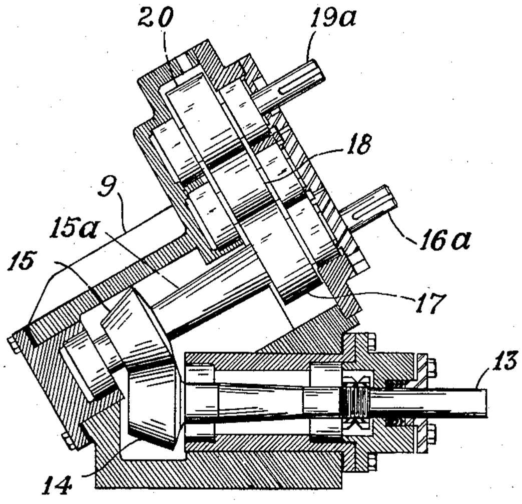
Fig. VIII
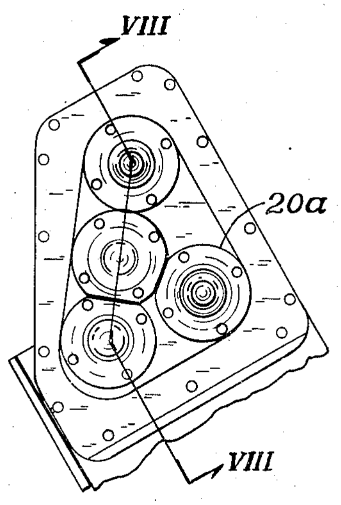
Fig. VII
INVENTORS
JOSEPH H. GETTIG &
ODD J. SKAWDEN
BY Brown, Critchlow, Flick & Peckham
THEIR ATTORNEYS Fig. XI
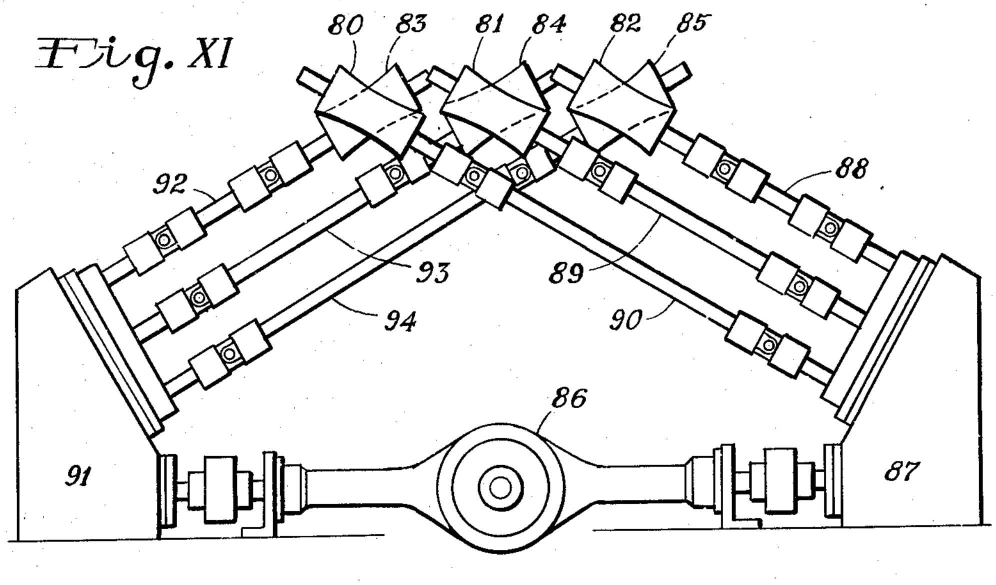
Fig. XII
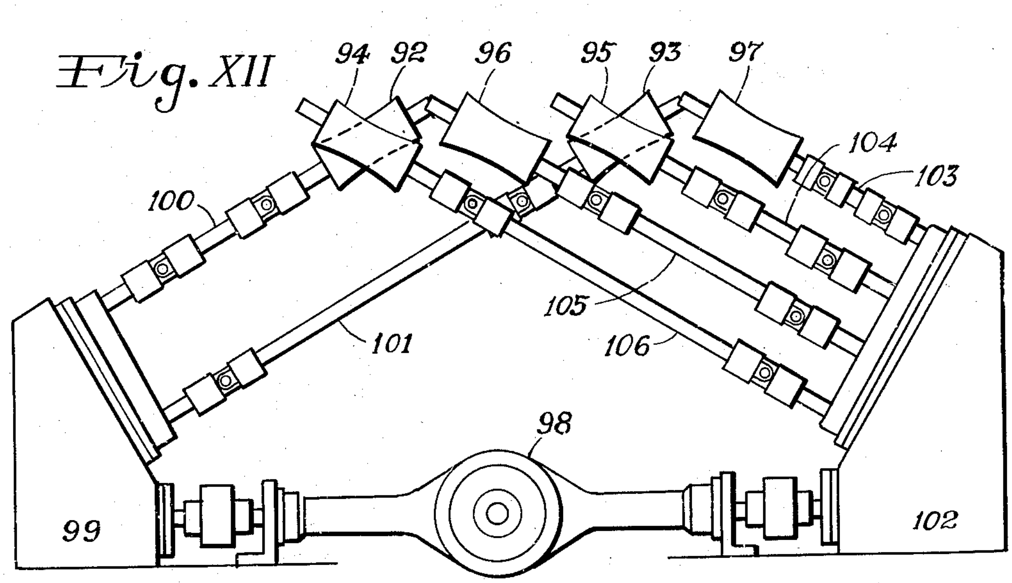
INVENTORS
JOSEPH H. GETTIG &
ODD J. SKAWDEN
BY Brown, Critchlow, Flick & Peckham
THEIR ATTORNEYS CROSS ROLL STRAIGHTENING APPARATUS IN WHICH THE OPPOSED ROLLS ARE DRIVEN THROUGH A DIFFERENTIAL MECHANISM
Filed July 12, 1955
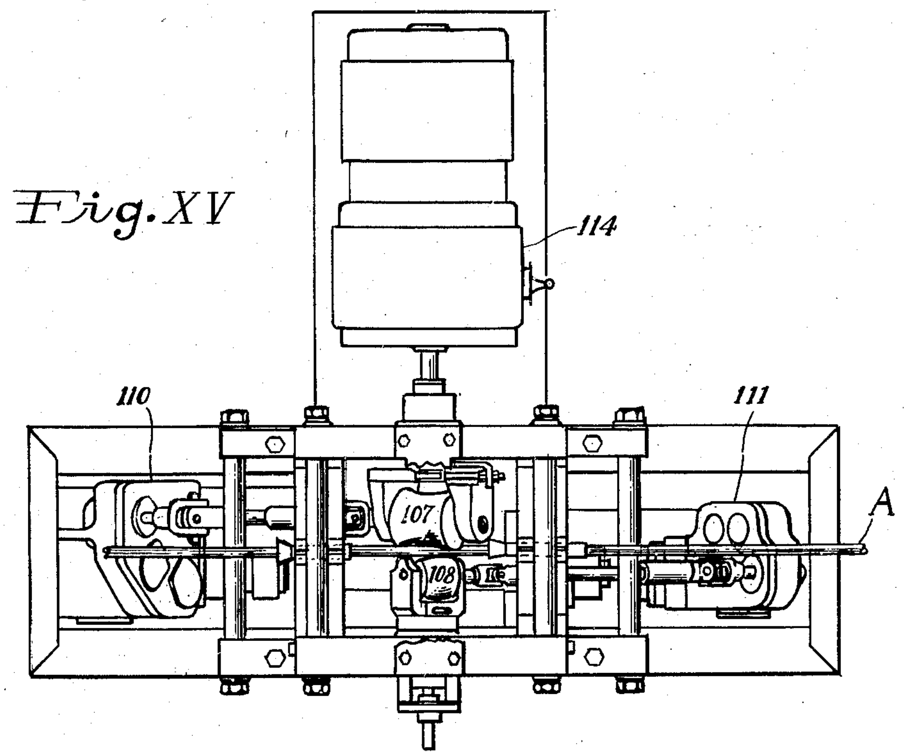
Fig. XV
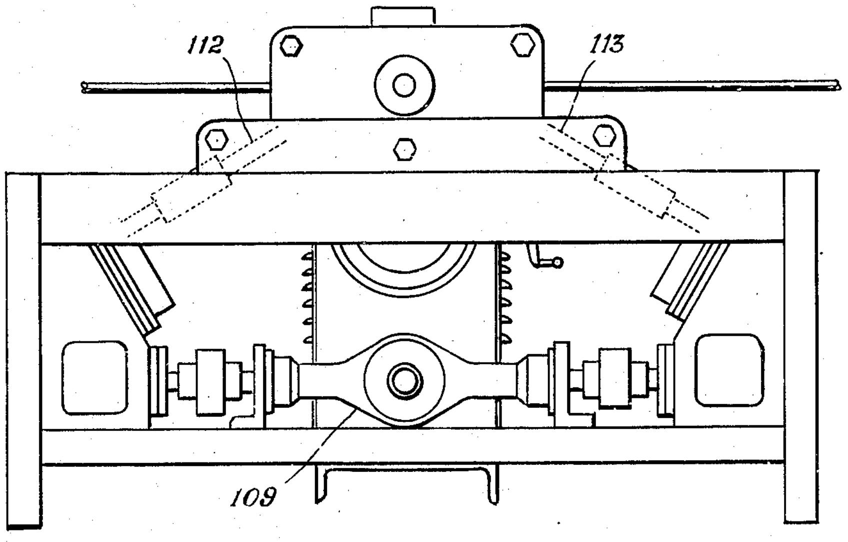
Fig. XIV
INVENTORS
JOSEPH H. GETTIG &
ODD J. SKAWDEN
BY Brown, Critchlow, Flick & Peckham
THEIR ATTORNEYS June 10, 1958 O. J. SKAWDEN ET AL 2,838,090
CROSS ROLL STRAIGHTENING APPARATUS IN WHICH THE OPPOSED ROLLS ARE DRIVEN THROUGH A DIFFERENTIAL MECHANISM
Filed July 12, 1955 8 Sheets-Sheet 7
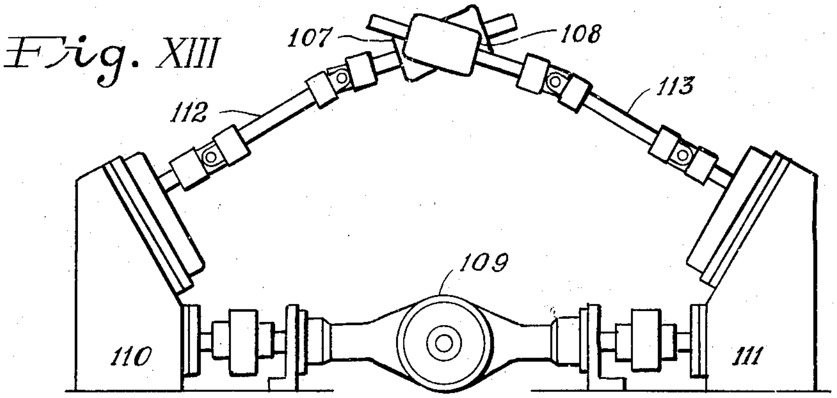
Fig. XIII
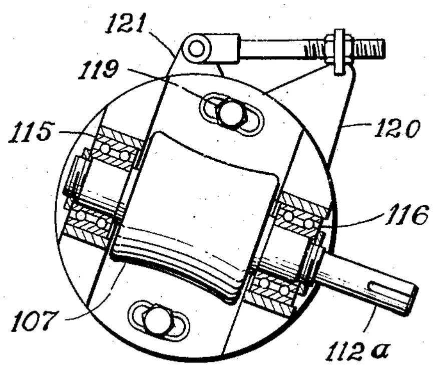
Fig. XVII
Fig. XVI
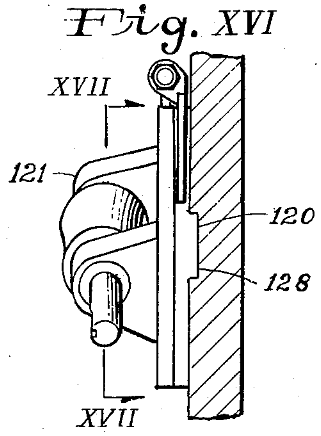
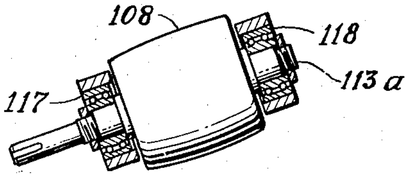
Fig. XIX
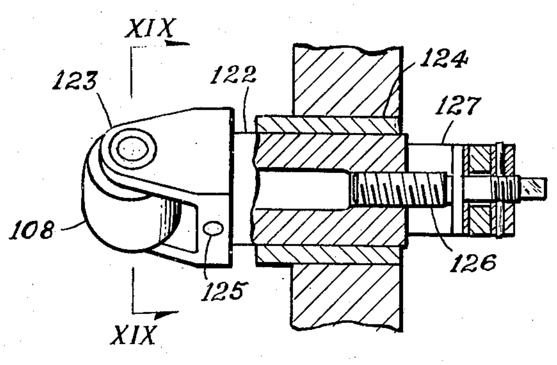
Fig. XVIII
INVENTORS
JOSEPH H. GETTIG &
ODD J. SKAWDEN
BY
Brown, Critchlow, Flick & Peckham
THEIR ATTORNEYS

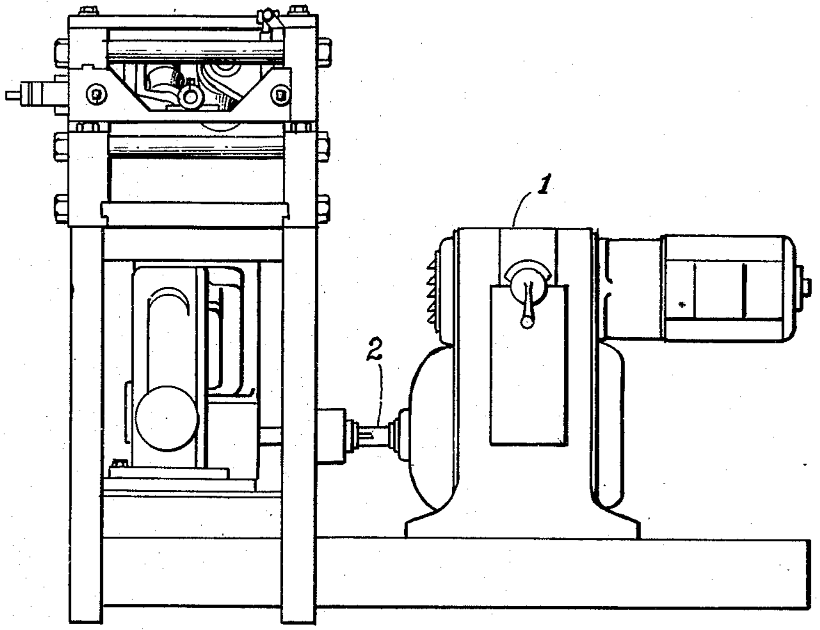
Fig. XX
INVENTORS
JOSEPH H. GETTIG &
ODD J. SKAWDEN
BY Brown, Critchlow, Flick & Peckham
THEIR ATTORNEYS United States Patent Office 2,838,090

Patented June 10, 1958

2,838,090

CROSS ROLL STRAIGHTENING APPARATUS IN WHICH THE OPPOSED ROLLS ARE DRIVEN THROUGH A DIFFERENTIAL MECHANISM

Odd J. Skawden, Bellefonte, and Joseph H. Gettig, Malvern, Pa., assignors to Sutton Engineering Company, Bellefonte, Pa., a corporation of Pennsylvania Application July 12, 1955, Serial No. 521,488

2 Claims. (Cl. 153—105)

Figure 1:
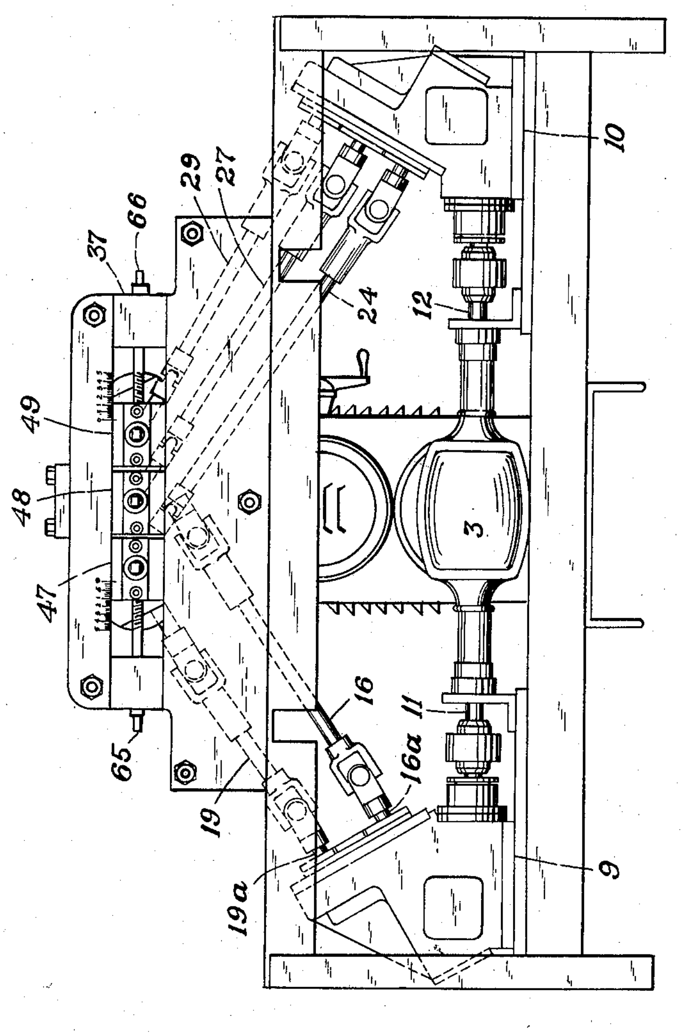

This invention relates to cross-roll apparatus for straightening bars, rods, tubes and like materials of circular cross-section.

In cross-roll straightening machines of the general type used for circular bars, rods and tubes, the rolls are contoured and are arranged in two banks with normally at least some of the rolls of the two banks paired in opposition to each other. The rolls of each bank are set angularly with respect to the rolls of the other bank. It is to be understood that each bank may comprise from one to an indefinite number of rolls. The several rolls form a pass line for the stock and the stock progresses longitudinally along the pass line with rotary motion imparted to it by contact with the rolls. If the rolls in one bank only be positively driven, the rolls in the other bank must be rotated about their axes by contact with the stock as it is propelled by the driven rolls. This results in frictional inbalance and a tendency to divert the stock from the pass line if the stock be difficult to straighten because of relatively great elasticity or particularly high resistance to deflection. The fact that the rolls of one bank are all driven by contact with the stock itself leads to surface markings on the stock and to some loss of speed, even if the stock be of a sort which is readily straightened and may result in sticking in the machine if the stock be of a sort which presents high resistance to the straightening operation. It is desirable, therefore, in machines of such sort positively to drive at least some rolls of both the banks.

There are, however, problems connected with the positive driving of both banks of rolls included in the straightening machine. If the positively driven rolls in the two banks have an effective speed differing from that of the rolls of the bank with which they are in opposition, all the problems incident to the practice of allowing all the rolls of one bank to idle are encountered and such problems are, in fact, intensified in some respects by the positive driving of the rolls in both generally opposed banks. Thus, such lack of uniformity in torque delivered by the roll banks leads to frictional imbalance and is particularly undesirable in that it tends to divert the stock from a true pass line.

For the above reasons, care is taken so to select driving gears for the rolls of the apparatus and so to apportion the relative size and setting of the rolls that a uniform torque is exerted on the stock by the rolls of the two respective roll banks. If such initial relative regulation could be maintained throughout the life of the machine, the problem would be solved merely by careful engineering and selection. It is, however, a fact that as the rolls wear and other irregularities in the operation of the machine develop, there is a departure from the uniformity in the effective surface speed with corresponding irregularity in the applied tangential force of the opposed roll banks. Upon the development of this inequality, there is a tendency to twist the round stock subjected to straightening with consequent scrolling on the surface of the stock, the imposition of torsional stresses in the stock and operating difficulties and loss of power resulting from a tendency for the stock to deviate from its proper pass line through the machine. If the circular stock be tubular, there is a tendency to deform the tubes from a true cross-sectional round conformation. The expedient of utilizing stationary guides to hold the stock in the pass line results in scoring and scratching the stock by contact with the guides.

It is a primary object of our invention to provide cross-roll straightening apparatus in which at least some of the opposed rolls of the two-roll banks are positively driven, which provides compensation for the various factors which may cause inequality in torque between the rolls of the two opposed banks.

It is to be understood that the underlying principle of the machine is to make such accommodation in the driving of the two roll banks that the torque, that is the tangential force exerted by the rolls, on the stock in a plane perpendicular to the axis of the stock which axis coincides with the pass line is equalized or substantially equalized in the two banks. Usually, both by initial intention and throughout the operation of the machine all the rolls of both banks are held to form an equal angle with the pass line of the machine and the torque equalization is, therefore, translatable into an equalization in the roll surface speed in the two opposed banks. It is, however, to be understood that under certain conditions in which either by accident or intent the rolls of the two banks form different angles with the pass line, the accommodation which tends to cause torque equalization consists of imposing a different surface speed on the rolls of the two banks in accordance with differential action.

It has been found that in the absence of a differential device, when the axes of two opposed rolls are disposed at unequal angles to the pass line and when both rolls are driven through appropriate gearing so that their surface speeds (i. e., their effective surface speeds) are equal, the stock is subjected to unequal tangential forces which tend to divert the stock from the pass line. This is caused by the fact that the roll which is disposed at the smaller angle to the pass line has a tangential component (i. e. the component normal to the pass line and tending to rotate the stock about its own axis) that is greater than that of the other roll. Also, because of its smaller angle to the pass line, this first mentioned roll has an axial component (i. e. the component parallel to the axis of the stock which coincides with the pass line) that is smaller than that of the other roll. When a differential device was introduced between these two rolls, it was found that the differential tends to equalize the tangential components of the two rolls and at the same time increase further the difference between their axial components. This result is reflected by an increase in the surface speed of the roll having its axis at the larger angle to the pass line and by a decrease in the surface speed of the roll having its axis at the smaller angle to the pass line. In this way the differential acts to keep the stock in the pass line.

It is convenient to consider the angular setting of the two-roll banks to be equal, under which condition torque equalization is synonomous with equalization in surface speed. We have discovered that a differential device gives the greatest possible measure of accommodation to any inequality in the angular setting of the rolls and that such mechanical differential acts to give this and other accommodations with great sensitivity as to accuracy and promptness of response to conditions or tendencies leading to inequality in the tangential force exerted by the rolls of the two banks.

It is a matter of great importance that the straightening apparatus of our invention is capable of operating on stock which requires heavy pressure without causing such stock to deviate from the pass line. This is because torque equalization between driven rolls in the two banks tends accurately to center pressure in the proper pass line, causing smooth progress of the stock through the machine. This is of great importance not only in straightening springy stock but also in straightening light wall tubing in which the relatively light pressures and extremely heavy deflections which must be employed should be accurately centered. This same centering effect avoids necessity for the use of guides, the disadvantages of which have been above noted.

It may also be noted that the invention herein embraces an arrangement of the rolls and the driving means therefor which gives compactness to cross-roll straightening machines comprising more than one roll in each roll bank.

In the accompanying drawings illustrative of the embodiment of our invention:

Fig. I is a side elevational view showing the invention as embodied in a five-roll round straightener;

Fig. II is a plan view of the machine shown in Fig. I;

Fig. III is a view taken partly in elevation and partly in vertical section on the line III—III of Fig. II showing as from the interior of the machine and on an enlarged scale the rolls of the two-roll bank of the machine shown in Figs. I and II, and illustrating a space-conserving connection of driving spindles to the rolls together with connections for making lateral and angular adjustments of the rolls;

Fig. III*a* is a cross-sectional view taken in the plane of the section line III*a*—III*a* of Fig. III, showing in detail the connection of a driving shaft to a roll of the machine;

Fig. IV is a cross-sectional view taken in the plane of the section line IV—IV of Fig. III;

Fig. V is a view on an enlarged scale taken partly in elevation and partly in vertical section in the plane of the section line V—V of Fig. II, showing as from the interior of the machine the rolls of the three-roll bank of the five-roll machine shown in assembly in Figs. I and II and the driving and adjusting connections thereto;

Fig. VI is a cross-sectional view taken in the plane of the section line VI—VI of Fig. V;

Fig. VII is an elevational view indicating the arrangement of gearing in the gear box by which the rolls of the two-roll bank are driven;

Fig. VIII is a vertical sectional view taken on an irregular section line VIII—VIII of Fig. VII, showing the gears contained in the gear box with the exception of one gear which is outside the section line and is therefore not shown, and showing additionally the proximate end and connections of a drive shaft to the gearing in the gear box;

Fig. IX is an elevational view indicating the arrangement of gearing in the gear box by which the rolls of the three-roll bank are driven;

Fig. X is a vertical sectional view taken on an irregular section line X—X of Fig. IX, showing the gears contained in the gear box with the exception of two idler gears which are out of line and are therefore not shown, and showing additionally the proximate end and connections of a drive shaft to the gearing in the gear box;

Fig. XI is a schematic view showing the invention as applied to one roll arrangement of a six-roll straightening machine;

Fig. XII is a schematic view showing the invention as applied to another roll arrangement of a six-roll straightening machine;

Fig. XIII is a schematic view showing the invention as applied to a machine for straightening rounds which comprises merely two opposed rolls;

Fig. XIV is an undetailed view showing in elevation a two-roll round straightening machine embodying the invention herein;

Fig. XV is a more detailed plan view of the two-roll round straightening machine shown in Fig. XIV;

Fig. XVI is a view taken partly in elevation and partly in vertical section showing one roll of the opposed pair comprised in the machine and the mounting and adjusting means therefor;

Fig. XVII is a view taken partly in elevation and partly in vertical section in the plane of the section line XVII—XVII of Fig. XVI;

Fig. XVIII is a view taken partly in elevation and partly in vertical section showing the other roll of the opposed pair comprised in the machine and the mounting and adjusting means therefor;

Fig. XIX is a vertical sectional view taken in the plane of the section line XIX—XIX of Fig. XVIII;

Fig. XX is an end elevation of a round straightening apparatus in accordance with the present invention, which view can be taken as showing the two end rolls at one end of a five-roll straightening machine, the two end rolls at one end of a generally similar machine, including all machines having one or more rolls in each bank driven in accordance with the present invention.

As noted above, the primary object of the instant invention is to equalize the torque exerted on the stock by the rolls of a cross-roll straightening machine for rounds. A practical embodiment of means to that desired end is shown in the drawings briefly described above.

Referring to the drawings, the main driving means for the machine comprises an electrical motor 1, which desirably is of the variable speed type. A drive shaft 2 leads to the mechanism of a differential device 3, which may be and desirably is a differential of a structure common in standard construction composed of an arrangement of differential gearing which provides torque equalization in two output shafts. The general principle of the mechanism is best known in its application to the automotive field, for equalization of torque at the rear wheels when they turn at different speeds as the vehicle moves through a turn. Through differential 3 all the rolls of the machine receive their driving power. As the machine is shown in Figs. I and II of the drawings, it comprises two banks of rolls, there being two rolls 4 and 5 in one bank and three rolls 6, 7 and 8 in the other bank. Rolls 4 and 6 are mounted in mutual opposition and rolls 5 and 7 similarly are mutually opposed. These two pairs of mutually opposed rolls form a pass line for the reception of round stock, a work piece of round stock designated by reference letter A being shown in Fig. II of the drawings in the pass line of the machine. The third roll 8 in the bank with rolls 6 and 7 is mounted between rolls 6 and 7 and opposite the interval between rolls 4 and 5 of the other bank. All the rolls of the machine are positively driven, although it is within contemplation of the invention to permit the unopposed rolls 8 to act as an idler roll if so desired. It is, however, preferable positively to drive such roll in order to avoid friction loss between the roll and the stock and to avoid diversion of the stock from the pass line. The function of the fifth roll 8 as is well understood in the art is to serve as a deflecting roll for deflecting the round stock from the pass line intermediate the points at which it is gripped respectively by the two pairs of opposed rolls.

The driving connections for the rolls of the machine comprise gearing for both the banks of rolls, these gears being housed in gear cases 9 and 10 to which respectively power is transmitted from differential 3 by shafts 11 and 12. Referring to Figs. VII and VIII of the drawings which show the gear case 9 through which the rolls of the two-roll bank are driven, an extension 13 of shaft 11 from differential 3 carries a bevel pinion 14 meshing with a bevel pinion 15 carried by a short shaft **15*a*. On shaft 15*a* there is a gear 17 which by its position hides in Fig. VIII a gear which carries the connecting stub 16*a*** for a roll-driving shaft 16 shown particularly in Figs. I and III. Gear 17 drives an idler pinion 18 which in turn drives the hidden gear on connecting stub 16*a*. Idler pinion 18 also meshes with a gear 20 which drives the connecting stub 19*a* for a flexible roll-driving shaft 19. The hidden gear meshing with the pinion 18 and given the same direction of rotation as gear 20 is not shown in Fig. VIII but its position is indicated at 20*a* in Fig. VII.

Referring to Figs. IX and X of the drawings which show the gear case 10 through which the rolls of the three-roll bank are driven, an extension 21 of shaft 12 from differential 3 carries a bevel pinion 22 meshing with a bevel pinion 23 on the connecting stub 24*a* which engages the proximate end of flexible driving shaft 24. On the shaft which terminates in stub 24*a* there is a gear 25 by which power is transmitted to gear 26 on the connecting stub 27*a* which engages the proximate end of flexible driving shaft 27 and from gear 26 to gear 28 on the connecting stub 29*a* which engages the proximate end of flexible driving shaft 29. Pinions to render the direction of rotation of the three gears and shafts uniform are interposed between gears 25 and 26 and between gear 26 and gear 28. The positions of these pinions are indicated at 30 and 31 in Fig. IX.

Referring now particularly to Figs. III and IV of the drawings which show rolls 4 and 5 together with the adjusting and immediate driving connections for them, it will be observed that the connections are such as to conserve the space commonly occupied by driving connections at the rolls and that the rolls of this bank and as will be described, the rolls of the three-roll bank are provided with all the adjustments desirable in round straightening machines of this general type.

Rolls 4 and 5 are rotatably mounted each in a forked bracket 32 and the two said brackets being identical in structure and in the manner of their mounting. Each bracket 32 is trunnioned centrally in a backing plate 33 and is adjustable angularly on its backing plate. Extended from the opposite face of the backing plate there is a projection 34 which lies in and is slidable in a longitudinal groove 35 in the machine frame. Adjusting screws 36 are engaged each with one of the slidable projections 34 of the backing plates and pass through unthreaded oversize holes in cross members 37 of the machine frame. Collars 38 and 39 are secured to each of the adjusting screws and being disposed on opposite sides of each of the members 37 through which the adjusting screw passes hold the adjusting screw in longitudinally fixed position. Rotation of either of the adjusting screws 36 slides projection 34 of its associated backing plate in longitudinal groove 35. This action moves either or both of the backing plates 33 carrying brackets 32 and rolls 4 and 5, to adjust the spacing of these rolls and determine the bending center therebetween.

Angular adjustment of each of rolls 4 and 5 is effected by means of an adjusting screw 40 having a pivoted clevis connection with ear 41 on bracket 32 and passing through a lug 42 carried by backing plate 33. Nuts 43 and 44 threaded on the shank of each adjusting screw 40 serve when turned to swing bracket 32 in either a clockwise or counter-clockwise direction. Bolts 45 engage with backing plate 33 and passing through short curved slots 46 of the brackets, permit limited turning movement of the roll-carrying bracket with respect to its backing plate. Bolts 45 being headed at the exposed face of the bracket secure the bracket to the backing plate. Backing plate 33 is secured to the machine frame by these same bolts 45, which passing through bolt holes in the backing plate also pass through short longitudinal slots in the machine frame. One of these latter slots 46, which permit longitudinal adjustment of the backing plate, is shown in Fig. III of the drawings.

The rolls 6, 7 and 8 of the three-roll bank, shown particularly in Fig. V of the drawings, have associated with them mounting and adjusting means which are generally equivalent to those associated with rolls 4 and 5 of the two-roll bank. In this construction three slide blocks 47, 48 and 49 are keyed at 50 in a longitudinally extended space in the machine frame. A bracket 51 for each of the rolls in the three-roll bank is mounted directly in a socket 52 in its associated slide block by means of an outwardly extended stem portion 53 of the bracket thereinto. Angular adjustment of each of the brackets 51 is made manually by means of a handle 54 by which stem 53 is turned in socket 52. To lock the bracket in adjusted position a clamp is provided by saw-cutting the slide block downwardly throughout its width and for a portion of its height at 55 and by saw-cutting from the inward terminal of the slide block at 56 inwardly to the saw-cut 55 throughout a portion of the width of the slide block. By running down clamping screw 57 this portion of the slide block acts as a clamp to engage the bracket stem and secure the bracket in angularly adjusted position.

Transverse adjustment of each of the roll brackets 51 is effected by means of an adjusting screw 58 which has a threaded engagement in a socket 59 of stem 53. The outer end of adjusting screw 58 passes through an oversize hole in outboard frame 60 and beyond the frame carries a nut 61 pinned to the adjusting screw. Inwardly of frame structure 60 adjusting screw 58 has a collar 62 which cooperates with a thrust plate 63 mounted at the rearward end 64 of slide block 48. Being confined between nut 61 on one side of outboard frame structure 60 and the abutment of collar 62 against thrust plate 63, adjusting screw 58 is held against longitudinal movement. Turning movement of the adjusting screw in opposite directions therefore produces either inward or outward movement of stem 53 with consequent adjustment of bracket 51 and the roll which it carries toward or away from the rolls of the opposed bank.

Adjustment of end slide blocks 47 and 49 is produced by means of adjusting screws 65 and 66 which are engaged respectively with slide blocks 47 and 49. These adjusting screws are each threaded in one of the cross-members 37 of the machine frame. By turning adjusting screws 65 and 66 in clockwise or counter-clockwise directions, slide blocks 47 and 49 are moved in one direction or the other longitudinally of the machine frame. In usual operations slide block 48 need not be moved. If, however, it becomes desirable to adjust the longitudinal position of that slide block, this can be effected by retracting one of the slide blocks 47 or 49, causing the other slide block to bear against central block 48 and then adjusting the positioning of the two end slide blocks to the desired spacing. This longitudinal adjustment of the slide blocks which carry the brackets of the three-roll bank gives an adjustment for the bending centers between rolls of that bank.

The specialized driving connections for the rolls 4 and 5 of the two-roll bank are shown in Fig. III of the drawings in which the roll 5 is shown in elevation and the roll 4 in vertical section. Although the driving connections will be described with reference to roll 4 with which they are shown in detail, it is to be understood that those connections are identical for both rolls. The driving shafts 19 and 16 for rolls 4 and 5 respectively are provided adjacent the rolls each with a universal and telescoping joint 70 to accommodate to the various adjustments which may be made in the position of the roll. As shown, driving shaft 19 has an extension 19*b* which passes through an externally threaded plug 71 carried by one fork of bracket 32 into the interior of the roll body, and at the further end of the roll lies in a similar plug carried by the other fork of the bracket. The forks 72 of brackets 32 are split in the regions in which they surround and engage plugs 71 and clamping screws 73 by forcing the two sections of each of the split forks toward each other, hold the plugs rigidly against radial movement. Ball bearings 74 surround extensions of the plug adjacent the ends of the roll and bearing sleeves 75 surround the shaft extension **19*b* in which it passes through the plugs and the bearings. The central region 76 of the shaft extension 19*b* is shouldered to bear against the ends of sleeves 75. The central region 76 of the shaft extension is keyed or splined to the roll, two keys 77** being shown. It should be explained that the connection between the shaft and the roll is such that the shaft acts tangentially in the roll but is not in radial contact therewith. As is shown in detail in Fig. III*a*, central region 76 of shaft extension **19*b* is spaced substantially from the roll surface in bore 78 of the roll. The keys 77 or equivalent splines on region 76 of the shaft are so proportioned that their edge surfaces also are spaced from the bases of sockets 79 in which they lie but so that the sides of the keys or splines can bear against the sides of the sockets. They are not so closely fitted in sockets 79 as of themselves to inhibit radial movement of the roll with respect to the shaft. Whereas two keys (alternatively splined) are shown, it is to be understood that any number of such connecting members from one upward can be used, in accordance with the general structure of each machine and the service conditions contemplated for it. Plugs 71 assume the pressure exerted on the roll by the stock and relieve the shaft of all load except the torque required to rotate the roll. These plugs also act as keepers by bearing against the outer ends of those sections of bearings 74** which are next the driving shaft.

This connection between the power-transmitting shafts of the machine and the rolls avoids the use of gearing adjacent the rolls, provides a space-conserving connection to the rolls and contributes to the smooth operation of the machine.

Referring particularly to Fig. V of the drawings, roll 7 is shown in section to show a driving connection identical with that shown in Fig. IV and rolls 6 and 8 of the three-roll bank are provided with identical driving connections. For simplicity and clarity the several elements associated with roll 7 shown in Fig. V are given reference numerals related to the reference numbers applied to identical elements associated with the roll 4 of Fig. III. Thus reference numeral **71*a* designates the thrust-assuming plugs at the opposite ends of the roll; reference numeral 72*a* designates the split forks of brackets 51 for mounting the several rolls 7, 8 and 9 of the three-roll bank; reference numeral 73*a* designates the clamping screws which act on the split forks rigidly to hold the plugs 71*a*; reference numeral 74*a* designates the ball bearings of the roll assembly; reference numeral 75*a* designates the bearing sleeves on the shaft extension of the assembly; and reference numeral 76*a* designates the central region in which the extension 29*b* of shaft 29 is keyed or splined to roll 7. Identically with the connection with the roll of the two-roll bank as shown in detail in Figs. III and IV, the central region 76*a* of shaft extension 29*b* is spaced from the adjacent surface of bore 78*a* and keys (or splines) 77*a*** have tangential but not radial contact with the roll structure in the sockets into which they extend.

It should be observed that roll 8 which is unopposed in the assembly is driven similarly to the end rolls 6 and 7, this positive drive of the unopposed roll tending to reduce the friction with the stock and contribute to smooth operation of the machine, as indicated above.

An important feature of the invention resides in so driving the rolls of the two opposed banks that they exert uniform torque on the stock, with the consequent advantages noted above. There also is great advantage in the novel roll mounting and driving connections which have been described. They greatly conserve space and permit the rolls to be moved in on close center distances, which is most necessary in working on springy stock. Also, they conform readily and by means of simple structure to the various adjustments provided for the rolls. The space conservation has special advantages in connection with round straightening apparatus in which the rolls are closely spaced.

The apparatus is effective in preserving the attractive appearance of stock such as furniture tubing and the like. Tubing of that sort commonly is composed of stainless steel, metal purposed for chrome finishing, brass, aluminum or other metal selected largely for its appearance. Rods and bars of like materials similarly benefit in marked order from the equalized action of the apparatus. The most important advantage is, however, that torque equalization of the opposed roll banks on the stock resides in the satisfactory straightening of stock which presents obstacles to the operation. The apparatus as shown and described provides the most satisfactory manner of equalizing torque application in the two roll banks and thus gives full advantage to the positive driving of the rolls of the apparatus, thereby avoiding the necessity or desirability of allowing one or more rolls of one bank to idle and thus to take up the surface speed of the rolls in the other bank. It avoids the disadvantageous effects of positively driving the rolls of the two opposed banks with unequal reaction on the stock. The rolls up to all the rolls of the apparatus can therefore be positively driven forcefully to give a maximum of pressure on the stock with a maximum of straightening effect thereon without stalling passage of the stock and with assurance that the machine will operate smoothly. The ultimate effect is analogous whether the immediate effect is to equalize the surface speed of the rolls in the two roll banks or to impose a differential surface speed thereon in equalizing torque between rolls which are crossed at a variant angle. In either instance, it is important that a mechanical differential as disclosed acts upon very slight divergence from perfect roll operation and that it performs its function with great promptitude.

The feature of imposing an equality of surface speed on the rolls of the two opposed banks is not restricted to any particular number of rolls included in the apparatus or to any specific roll arrangement. Thus the apparatus embodiment of the invention may comprise a great number of rolls or the machine may comprise only two rolls, such last noted machine consisting in effect of two one-roll banks. The only requirement is that the machine must include at least two rolls mounted in opposition and both driven by way of a single differential device.

Figs. XI and XII of the drawings show schematically two different roll arrangements each comprising six rolls. Considering first the roll arrangement shown in Fig. XI, the rolls of both banks all are mounted in direct opposition, the rolls 80, 81 and 82 of one bank being opposed by rolls 83, 84 and 85 of the other bank. All rolls of both banks are driven through differential 86, rolls 80, 81 and 82 being driven through gears in gear case 87 and through flexible shafts 88, 89 and 90 and rolls 83, 84 and 85 being driven through gears in gear case 91 and through flexible shafts 92, 93 and 94. It is to be understood that the gear arrangement in gear cases 87 and 91 can be identical with the arrangement in gear case 10 shown in detail in Figs. IX and X. The angling adjustments in both banks and the in and out adjustments in one bank can be accomplished by means identical with those shown in Fig. I to Fig. VI inclusive. Longitudinal adjustments can be made by means identical with or similar to those shown in Figs. I, II, V and VI of the drawings. The driving connections to all the rolls desirably are identical with the driving connections shown in Figs. III and V of the drawings.

Referring to the roll arrangement shown in Fig. XII, five of the rolls 92, 93, 94, 95 and 96 are arranged identically with the roll arrangement in the machine shown in Figs. I to X inclusive. That is, the rolls 92 and 94 are mounted in opposition; the rolls 93 and 95 are also mounted in opposition and the roll 96 is unopposed in the assembly. There is, however, an additional unopposed roll 97 mounted in an outboard position with respect to the fundamental roll arrangement of the machine. All the rolls are driven through differential 98, rolls 92 and 93 being driven from a gear case 99 by means of flexible shafts 100 and 101 and rolls 94, 95, 96 and 97 are driven from gear case 102 by means of flexible shafts 103, 104, 105 and 106. Gear case 99 may be identical with gear case 9 shown in detail in Figs. VII and VIII and gear case 102 involves such modification over gear case 10 as provides for the operation of an additional driving shaft. The angling adjustment of the rolls can be effected by means shown in Figs. I to VI inclusive of the drawings, and the transverse adjustment of rolls 94, 95 and 96 and 97 can be effected by means such as those shown in Figs. V and VI of the drawings. Longitudinal adjustment of rolls 92 and 93 can be effected by means such as those shown in Fig. IV of the drawings. In effecting longitudinal adjustment of rolls 94, 95, 96 and 97, adjusting screws can be provided to move rolls 94 and 97 in both directions and longitudinal movement of those rolls can be used to give adjustment of rolls 95 and 96.

In Figs. XIII to XIX inclusive there is shown straightening apparatus comprising only two rolls mounted in mutual opposition, this machine being composed of what may be considered as two one-roll banks. This roll arrangement is shown schematically in Fig. XIII, the machine assembly and structural details thereof being shown in the succeeding figures of the drawings. In Fig. XIII the two opposed rolls are designated by reference numerals 107 and 108. This figure of the drawings shows also that both the said opposed rolls are driven through differential 109, respective gear cases 110 and 111 and flexible shafts 112 and 113.

Assembly views namely Figs. XIV and XV show an electrical motor 114 as the source of power for operating the machine, this motor delivering its driving power by way of differential 109 and the other noted connections to the rolls. As shown, the general structure of the machine follows closely the structure of the machine shown in Figs. I to X inclusive of the drawings. In the driving connection of shafts 112 and 113 to the rolls, however, there being no particular desirability in space economy within the bounds of the machine frame, the anti-friction bearings 115 and 116 for the roll 107 and the like bearings 117 and 118 for the roll 108 are carried for the two rolls respectively on stub shafts 112*a* and 113*a* of one piece with and extended outside the bodies of the rolls. If, however, it is desirable so to do, the driving shafts can be connected interiorly of the rolls in the manner shown in the preceding figures of the drawings. In a two-roll straightening machine of the type shown the entire straightening operation is effected by deflecting the stock within the concavity of one of the rolls. It is, therefore, possible to make one of the two opposed rolls of a contour which would be developed along a straight line or even to make it slightly convex, as is the roll 108 shown in Fig. XIII. The roll 107 is shown as concave and the straightening effect is obtained by bending the stock into the concavity of this roll.

Angular adjustment of roll 107 is effected in the same manner as in the embodiment shown in Figs. I to X inclusive by means of an adjusting screw 119 anchored to backing plate 120 and having a pivotal connection with bracket 121. Angular adjustment of roll 108 is effected in the manner shown in Fig. VI of the drawings by means of a stem 122 extended from bracket 123 into a block 124, or other solid structure of the machine. A socket 125 provides reception for a handle by means of which the bracket can be moved angularly. Transverse adjustment of roll 108 is effected as in the showing of Fig. VI by means of adjusting screw 126 engaged with stem 122 and held against linear movement. As in the structure shown in Fig. VI, adjusting screw 126 is mounted in an outboard frame structure 127 carried by the slide block. It will be noted that the slide block 124 is shown as an element in the mounting structure for roll 108. Also, backing plate 120 for bracket 121 has a projection 128 slidable in a longitudinal groove in the machine frame. These elements are consistent with adjustment of the two rolls longitudinally of the machine frame. Since, however, no such adjustment would commonly be employed, no adjusting screws are specifically shown.

Referring now to Fig. XX of the drawings, as stated in the brief description the figure shows in end elevation a machine which from the position of view may include any one of the roll arrangements described above, save probably the roll arrangement shown in Fig. XII. For simplicity, however, it will be assumed that the roll arrangement is the one shown in Figs. I to X inclusive of the drawings, as only the two rolls at an end of the machine can be applicable to any of the roll arrangements. Thus, the driving motor of the machine is designated by reference numeral 1 and the drive shaft to the differential by reference numeral 2. The gear case 10 is the gear case which lies to the right in Figs. I and II showing the five-roll machine and the rolls 5 and 7 shown similarly are the rolls lying to the right in those figures of the drawings. A tube A is shown between those rolls. Reference numeral 37 designates the cross member which carries the adjusting screws for longitudinally adjusting the rolls of both banks and reference numeral 60 designates the outboard frame in which the adjusting screws for transversely adjusting the rolls of the three roll bank are mounted.

The advantages of the differential drive have been explained in detail in previous portions of the specification. It has also been indicated above that the differential drive is not intended to cure inequality in the torque exerted by the rolls of the opposed roll banks caused by faulty design or construction. As each machine is designed and built, care should be taken to provide such gear ratios and careful machining that the rolls of one bank inherently exert the same tangential force on the stock as the rolls of the opposed bank. Even if the initial structure closely approximates perfection, it is inevitable that some inequality will develop in bearings, angular mounting of the rolls, driving elements or more particularly in unequal wearing of the rolls themselves. It is such developed inequalities that are cured by the action of the differential.

Having disclosed one embodiment of our invention and having indicated certain of the modifications which may be made in that embodiment, we wish it understood that various structural changes can be made in the embodiment of our invention and that such changes within the bounds of the appended claims are within the purview and scope of the invention.

We claim as our invention:

1. In a cross roll straightening machine, for straightening round stock, constructed to have a pass line extending through the machine and having a pair of opposed cross rolls at least one of which rolls has a concave working surface and which rolls define a work pass coinciding with the pass line, the combination comprising the aforesaid rolls, a separate gear assembly for each roll, shaft connections between each gear assembly and its associated roll, a differential device, driving connections between the differential device and each of the gear assemblies, the gear assemblies being adapted to drive the rolls at substantially the same effective surface speed when the driving connections from the differential device to each gear assembly rotate at substantially the same angular velocity, and a single source of power connected to the differential device for simultaneously driving the two rolls, whereby when the axes of the rolls are disposed at unequal angles relative to the pass line the roll disposed at the smaller of said angles will have a lower effective surface speed than the other roll.

2. In cross roll straightening apparatus having two banks of angularly disposed and mutually crossed rolls, the combination comprising a frame for supporting the rolls, two gear assemblies mounted within the frame at opposite ends thereof, shafting connections between each gear assembly and the rolls in one of the roll banks, the shafting connections to the rolls of at least one of the roll banks engaging the rolls therein interiorly of those rolls by tangential means and without radial bearing thereagainst, a differential device mounted on the frame between the two gear assemblies, driving connections between the differential device and each of the gear assemblies, said driving connections being disposed at an acute angle to the shafting connections associated with each gear assembly, and a single source of power connected to the differential device for simultaneously driving both banks of rolls.

References Cited in the file of this patent

UNITED STATES PATENTS

| | | |
|---|---|---|
| 1,441,707 | Oslund | Jan. 9, 1923 |
| 1,767,088 | Metcalf et al. | June 24, 1930 |

FOREIGN PATENTS

| | | |
|---|---|---|
| 634,987 | Great Britain | Mar. 29, 1950 |